June 12, 1934.  H. L. READ  1,962,750

CARD REPRODUCING MACHINE

Filed June 23, 1932  9 Sheets-Sheet 1

INVENTOR
Harold L. Read
BY
WM Wilson
ATTORNEY

June 12, 1934.   H. L. READ   1,962,750
CARD REPRODUCING MACHINE
Filed June 23, 1932   9 Sheets-Sheet 5
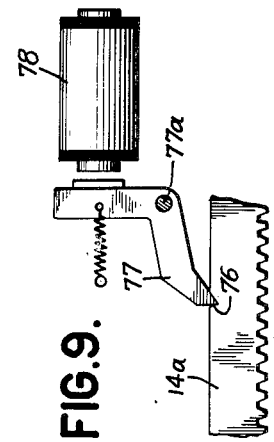
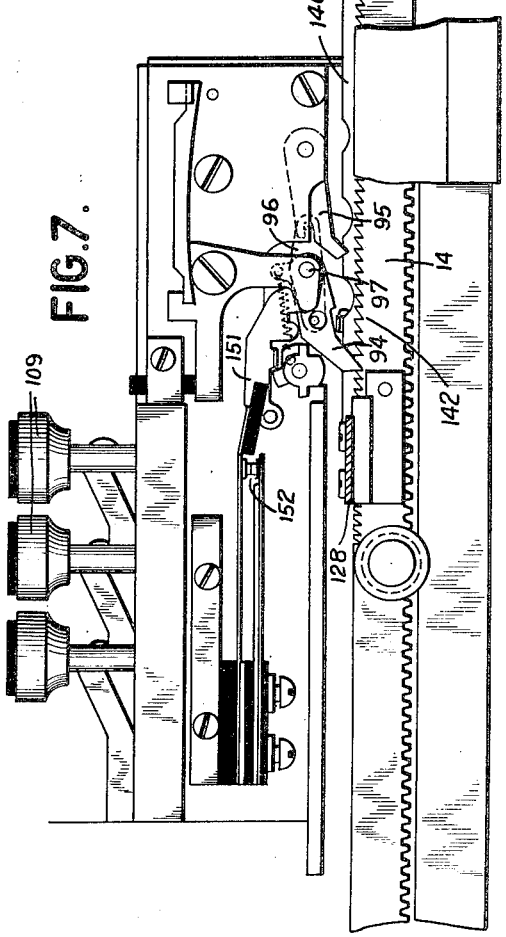
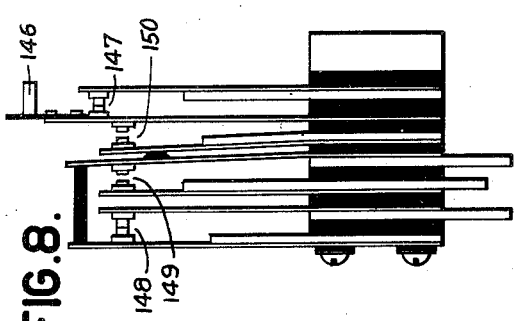
INVENTOR
Harold L. Read
BY
W M Wilson
ATTORNEY

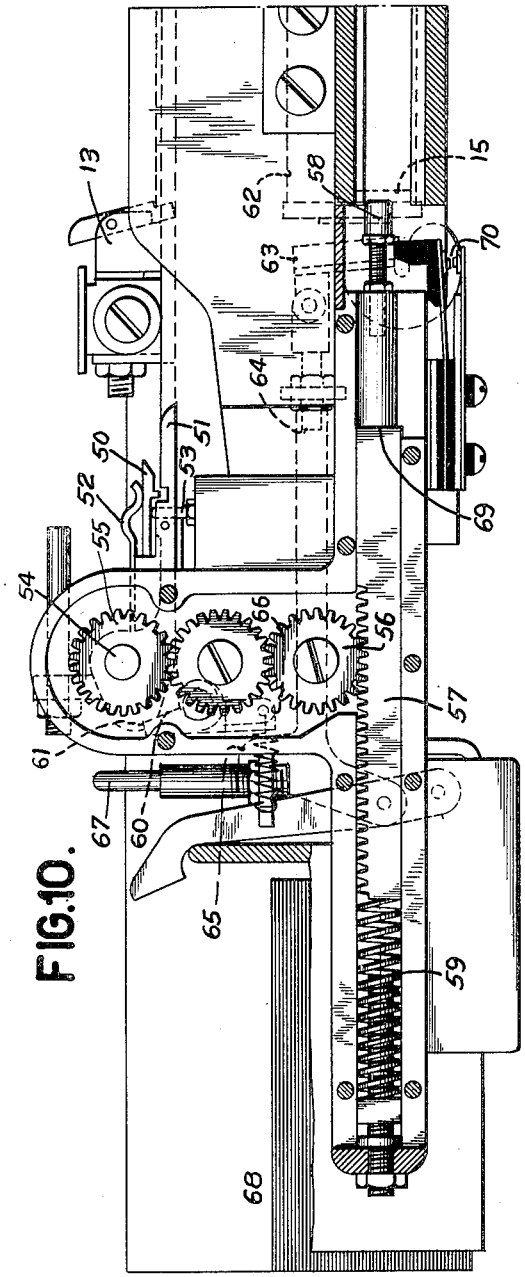

June 12, 1934.  H. L. READ  1,962,750
CARD REPRODUCING MACHINE
Filed June 23, 1932  9 Sheets-Sheet 7
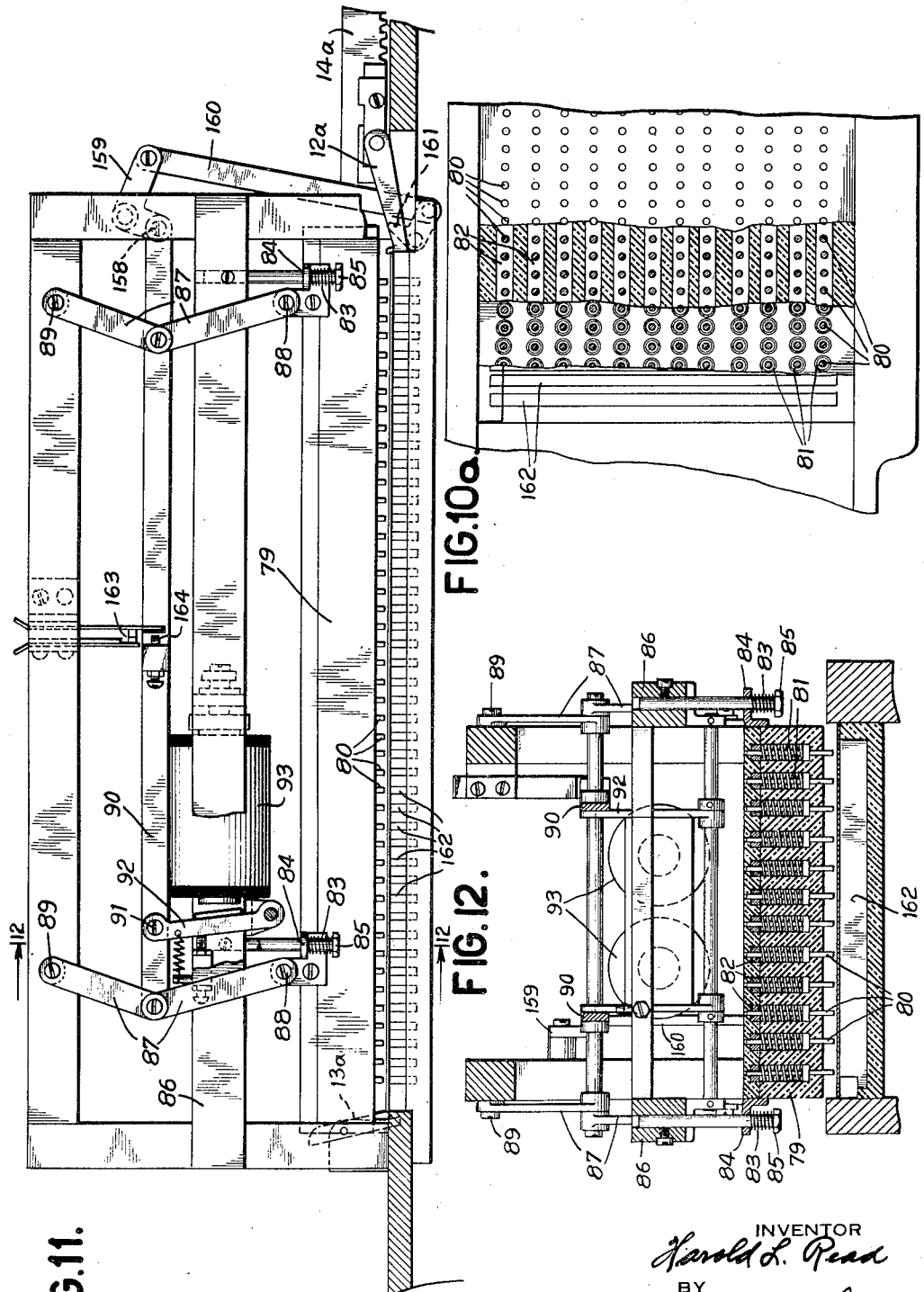

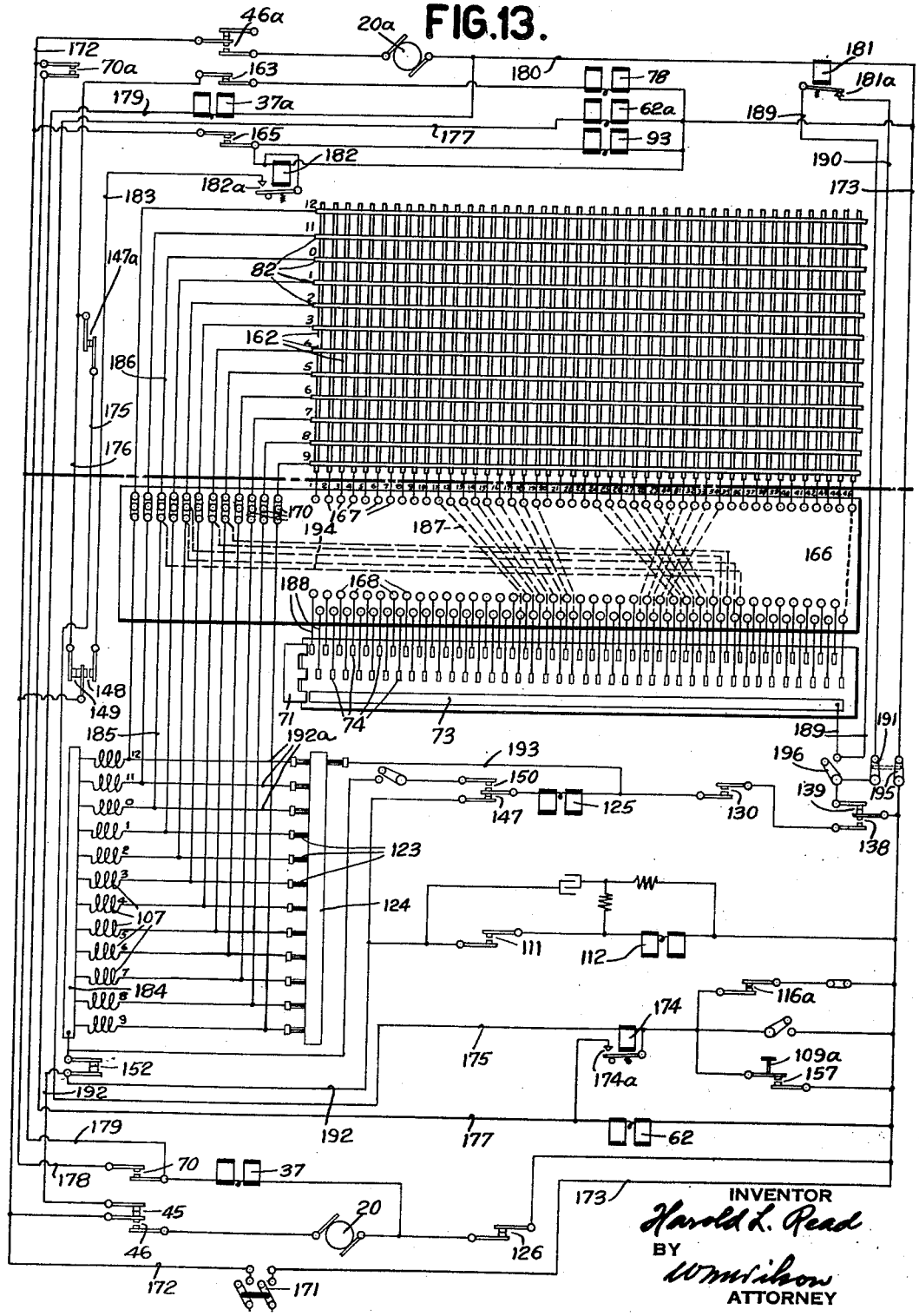

June 12, 1934. H. L. READ 1,962,750
CARD REPRODUCING MACHINE
Filed June 23, 1932 9 Sheets-Sheet 9

INVENTOR
Harold L. Read
BY
W. M. Wilson
ATTORNEY

Patented June 12, 1934

1,962,750

UNITED STATES PATENT OFFICE 1,962,750

CARD REPRODUCING MACHINE

Harold L. Read, Endicott, N. Y., assignor, by mesne assignments, to International Business Machines Corporation, New York, N. Y., a corporation of New York Application June 23, 1932, Serial No. 618,857

5 Claims. (Cl. 164—115)

This invention is directed to improvements in card punching apparatus.

In the tabulating machine art it is the common practice to punch cards with perforations which designate various kinds of statistical data. These cards are then utilized in sorting and tabulating machines to obtain various classified records of the data on the cards. In the use of such tabulating systems, it becomes necessary, from time to time, to duplicate comparatively large groups of cards.

Such duplications, when performed by hand punching operations are time consuming, expensive, and difficult. Furthermore, copied cards, which depend upon the operator's reading the previously punched card are subject to errors.

Machines have been devised for mechanically duplicating record cards but all of these machines, as far as I am aware, have had certain inherent objectionable features which this invention has been designed to obviate.

One of the essential objects of the invention is to provide a simple and efficient coordination of parts in a duplicating or reproducing machine so that, if it is desirable, a part of the data derived from the original punched card may be suppressed, and also, the data on the new cards may be punched in a different manner and in a different order of fields and columns than that of the original cards.

Provision is also made of improved mechanism for automatically punching repetition data in any selected fields on the new cards.

The apparatus included in the invention comprises a reading unit and a punching unit. Both units are provided with similar mechanism for introducing a punched card to the reading devices in one unit, and a blank card to the punching devices in the other unit. The card in the reading unit is read or sensed in each data recording position by means of a so-called pin box which upon engagement with the card makes contact through each perforation therein. The columns of pins are then tested in any preselected order as the card in the punching unit advances step-by-step or column by column, receiving perforations in the same index point positions as in the selected columns of the originally punched card. When the last column of the blank card has been acted upon, the pin box is moved out of engagement with the initially punched card, which is then, concurrently with the newly punched card, ejected from the machine. Similar ejecting mechanism is used in each machine.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 7 is a detail view of the escapement mechanism of the punching machine.

Fig. 8 is a detail of the contacts shown in Fig. 7.

Fig. 9 is a detail of the carriage release mechanism of the reading machine.

Fig. 10 is a partial elevation of the left end of the punching machine showing the card ejecting mechanism. The view is taken on line 10—10 of Fig. 1.

Fig. 10a is a detail of the sensing mechanism.

Fig. 11 is a partial elevation of the central section of the sensing machine showing the pin box control mechanism taken on line 11—11 of Fig. 1.

Fig. 12 is a section of the sensing mechanism taken on line 12—12 of Fig. 11.

Fig. 13 is a wiring diagram of the electric circuits of the two machines showing the controlling connections.

Fig. 14 is a detail of a punched controlling card.

Fig. 15 is a detail of a new card perforated under control of the card in Fig. 14.

The entire apparatus is similar in its card feeding, punching, and card ejecting mechanism to that shown and described in detail in the patent to C. D. Lake et al., No. 1,914,263, issued June 13, 1933 to which application recourse may be had for details of construction and operation and only sufficient thereof will be herein explained to secure a comprehensive understanding of the present invention.

Card feeding mechanism

The card feeding mechanism is the same for both the sensing and punching machines and it will be understood in the following description of the operation of the punching machine feeding mechanism that similar parts in the sensing machine perform similar functions.

Cards are fed from supply hoppers 10 and 10a (Fig. 1) by picker knives 11 and 11a which advance the cards to present them to punching and sensing positions respectively. In this position card carriages comprising pushers 12 and 12a and forward guides 13 and 13a (Figs. 3 and 11) engage the cards and advance them under control of escapement mechanism to be described later.

Figure 2:
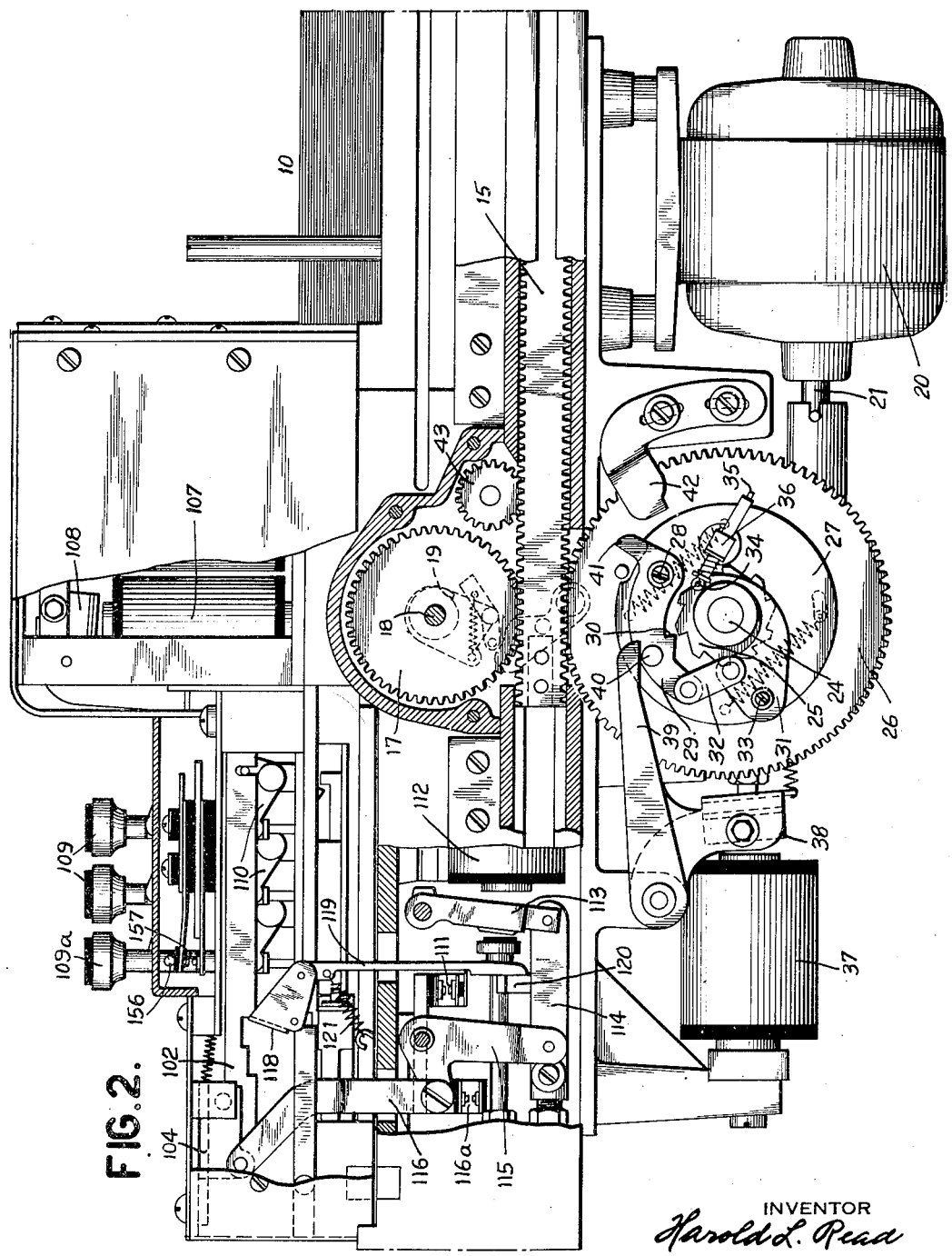
Fig. 2 is a partial side elevation of the punching machine, broken away to show some of the interior mechanism. The view is taken on Fig. 1 looking in the direction of line 2—2.

Pusher 12 and guide 13 are carried by an escapement rack 14 and picker knife 11 is carried by a rack bar 15 (see also Fig. 2). Rack 14 has a gear 16 meshing with its lower edge and bar 15 has a gear 17 meshing with its upper edge, both gears being mounted upon a cross shaft 18.

Figure 1:
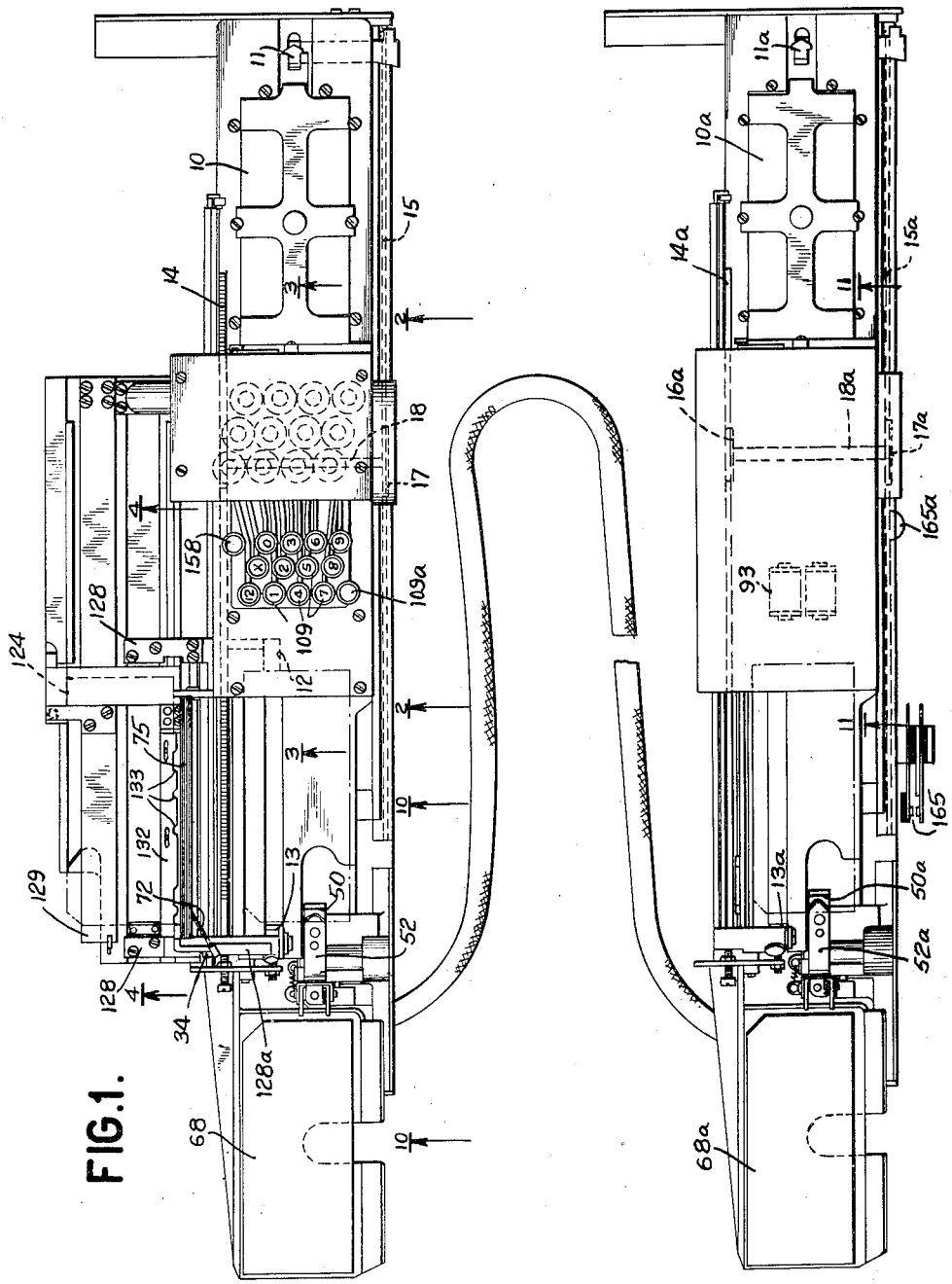
Fig. 1 is a plan view of the machines comprising the card reproducing system.

Due to this connection between the elements, movement of picker 11 toward the left, as viewed in Fig. 1, is accompanied by movement to the right of pusher 12 and this action will deliver a card from the bottom of hopper 10 to punching position where pusher 12 engages it and further advance will be under control of the escapement mechanism. A one-way clutch mechanism generally designated at 19 in Fig. 2 permits the immediate return to the left of bar 15 and picker 11. Escapement bar 14a of the sensing machine is similarly geared to bar 15a and related parts are similarly numbered with the letter "a" suffixed.

The operation of card feeding just outlined is more fully explained in Patent No. 1,772,186 to F. L. Lee, et al., for a Duplicating punching machine and needs no further description here. The escapement mechanism referred to is of the same general nature as that disclosed in the Schaaff Patent No. 1,426,223 and a brief description thereof will be given later.

Secured to the underside of the base of each machine is a motor 20 (Figs. 2 and 3) coupled to a stub shaft 21 to which is secured a worm 22 in mesh with a worm wheel 23 secured to a shaft 24, one end of which has secured thereto a ratchet shaped clutch element 25. Loosely mounted on shaft 24 is a gear 26 meshing with teeth on the lower edge of rack bar 15 and on which gear is mounted a disk 27. Pivoted at 28 to disk 27 is an arm 29 having a clutch tooth 30. The free end of arm 29 is connected to a toggle plate 31 by a link 32, the end of toggle plate 31 distant from its pivot 33 being articulated at 34 to a rod 35. The rod 35 is spring impelled and fits in an aperture in a pin 36, rotatably mounted on disk 27.

For the purpose of effecting a clutching action a magnet 37 is provided which, when energized, attracts an armature 38 so that arm 39 engaging a pin 40 of arm 29 will rock the tooth 30 into engagement with ratchet wheel 25.

Through link 32 the toggle connection will be moved centrifugally the spring on rod 35 acting to hold clutch tooth 30 in engagement with the ratchet teeth. Gear 26 will thereupon be driven in a counterclockwise direction substantially a single revolution, shifting rack bar 15 to the left to feed a card from the supply hopper. This will result, as premised before, in the movement of pusher 12 to the right to engage the newly fed card.

At the termination of the counterclockwise movement of gear 26, a tail 41 of arm 29 will strike a projection 42 of a fixed plate to effect the disengagement of the tooth 30 and ratchet 25 by a reverse action. Gear 26 and rack bar 15 are returned to the position of Fig. 2 through a gear 43 connected to a spring barrel (not shown). The one-way clutch 19 permits such action without affecting the escapement rack 14.

Also secured to the pivot of armature 38 is an arm 44 (Fig. 3) the free end of which is adapted to bear upon an insulating block to open contacts 45 and close contacts 46 when magnet 37 is energized. The contacts are maintained in shifted position by a latching bell crank 47, a lug of which is adapted to be engaged by a bent-up plate 48 secured to gear 26, at the termination of the driving movement of the latter.

Automatic card ejector

Means are provided in both machines for automatically removing completely sensed and punched cards and depositing the same in receptacles provided for the purpose. This mechanism is described in detail in the application of J. M. Cunningham, Serial No. 390,755, filed September 6, 1929 to which application recourse may be had for details of construction and operation.

Stated generally, the gripper (Fig. 10) comprises a pair of jaws 50 and 51 urged together by a flat spring 52 but the abutment of a pin 53 with the upper jaw 50 separates the jaws in order that the punched card (or sensed card) may be received by the slit-like separation. The card occupies a position between the jaws at the termination of the punching of the last columns of the new card, or when the initially punched card has been removed from the sensing mechanism.

The gripper is pivotally mounted on a shaft 54 to which is secured a gear 55 adapted to be driven by a gear 56 through an idler gear. Meshing with gear 56 is a slidably mounted rack 57 the extremity of which terminates in an adjustable cylindrical plunger 58. During the previous restoration of the card carriage the end of rack 15 engaged plunger 58 to shift rack 57 to the left against the tension of a spring 59. This caused a clockwise movement of shaft 54 through the train of gears 56—55 to bring the gripper unit to the position shown in Fig. 10, whereupon a latch lever 60 engaged a shoulder 61 of the lower jaw 51. Incidentally, a certain amount of compression was stored up in spring 59. Shifting of latch 60 is effected by energization of the magnet 62 which attracts its armature 63 when the magnet is energized. This causes a shifting movement of a link 64 to the right and by means of a cam shoulder 65 and arm 66 secured to the pivot shaft of latch 60, will rock the latter. This will result in the release of spring 59 to cause the counterclockwise rotation of the gripper unit. As the jaw 50 leaves pin 53 spring 52 will act to close upon the lower jaw 51 thus securely gripping the card and flipping the same in reversed position. A stationary pin 67 may suitably coact with one of the jaws to separate them, permitting the released card to fall into a receptacle 68. As the card is ejected, shifting of rack 57 by spring 59 will cause a square shoulder 69 to engage and close contacts 70 and in the sensing machine contacts 70a.

Punching machine escapement

The escapement mechanism of the punching machine (Fig. 7) comprises a stepping dog 94, a locking dog 95 and an operating arm 96 which is mounted on a rod 97. The rod 97 is rocked to escape rack 14 one tooth as an incident to a punching operation in a manner presently to be described.

*Operation of the punching machine*

Figure 3:
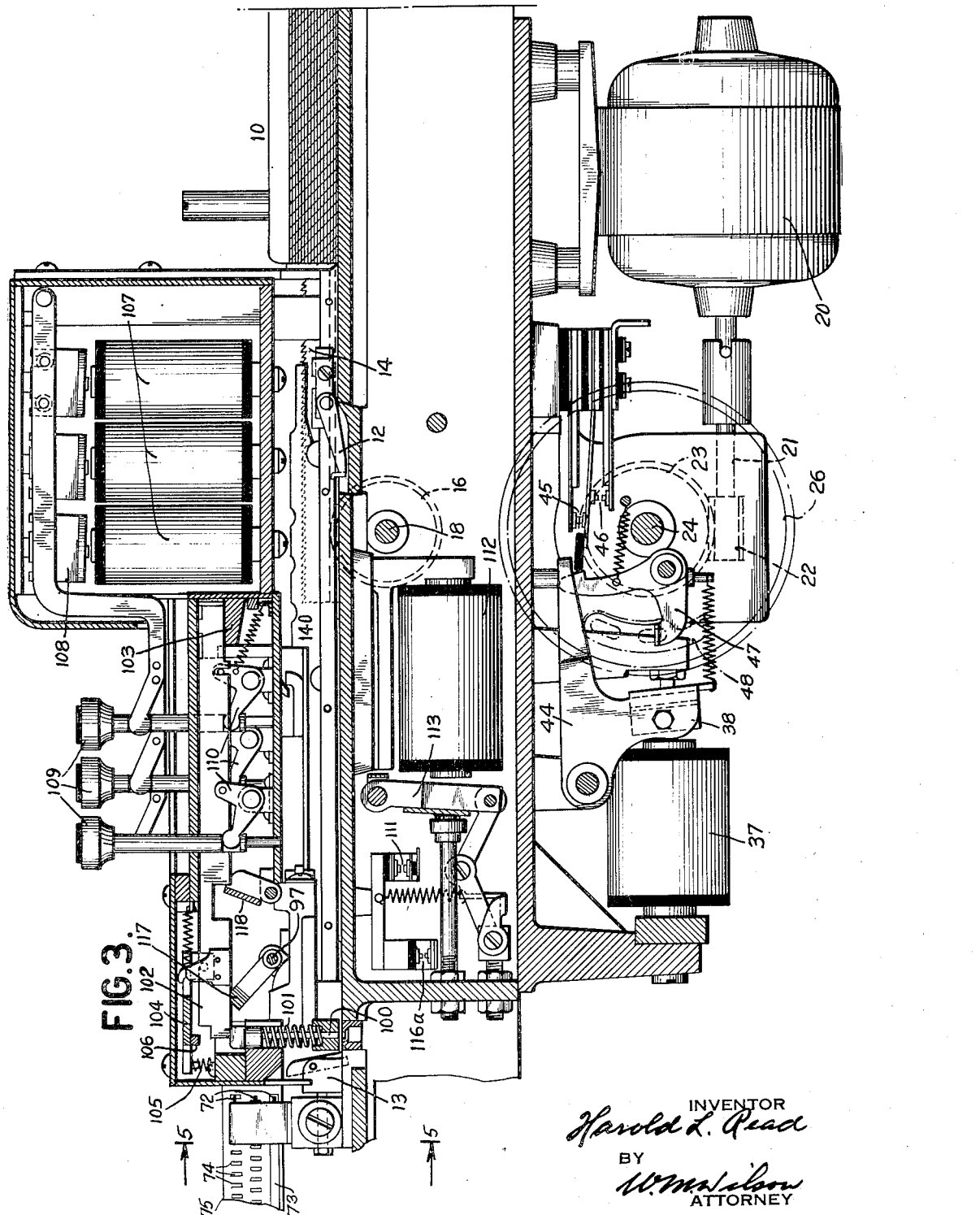
Fig. 3 is a partial central section of the punching machine, the section being taken on line 3—3 of Fig. 1.

In Fig. 3, the punches 100 are of rectangular cross-section and mounted in a manner disclosed in the Patent 1,772,186, issued to F. L. Lee et al., dated August 5, 1930, and are normally held in raised position by spring 101. Resting on the upper ends of said punches are interposers 102 supported at their rear ends on a cross member 103. The interposers 102 are so notched at their forward ends that when they are in normal position as shown depression of an actuating plate 104 against a spring 105 will move a portion 106 of the plate into such notches.

However, when any numeral magnet 107 is energized under control of the sensing devices it will actuate its armature 108 to depress the corresponding key 109 which in turn will actuate a bell crank 110 against the action of a suitably connected spring. The upright arm of each bell crank 110 has a pin and slot connection with an interposer 102. Such interposer will then be advanced to such a position that depression of the member 104 will effect depression of the interposer and consequently of the corresponding punch.

Upon movement of any of the interposers 102 a pair of contacts 111 is adapted to be closed, thereby closing the circuit to the punch magnet 112 which through intermediate mechanism is adapted to rock the depressor plate 104 to actuate the selected punch 100. Subsequently, the circuit of the magnet 112 will be broken allowing the return of the depressed interposer to normal position.

Upon energization of punch magnet 112 in this manner, its armature 113 (see also Fig. 2) will be swung about its pivot and, through link 114, will rock a bell crank 115 to draw the link 116 downward and rock plate 104. Depression of any interposer 102 will, through incidental depression of bail 117, rock rod 97 to render the escapement mechanism effective and the rack 14 and the blank card carriage will advance one tooth to permit punching in the next column of the card.

Across the lower edge of all the interposers is a pivoted bail 118 reaching into notches in the interposers. Attached to the bail is a depending finger 119 held against a bracket 120 on link 114 by a suitable spring 121. This spring also tends to pull link 119 downwardly, rocking bail 118 clockwise into engagement with the right hand shoulders of the notches in the interposers. Link 119 has a shoulder near its free end normally hooked under the lower blade of contact 111. When an interposer 102 is advanced to operative position the bail 118 is rocked counterclockwise, raising link 119 and causing contacts 111 to be closed. As the punch passes through the card and link 114 moves to the right the bracket 120 will push the link 119 to the right so that the lower contact leaf will be released and contacts 111 will then open. It will be recognized that when the lower contact leaf is released, contacts 111 cannot be closed again until the magnet 107, which effected their closing, has been deenergized.

Operation of any punch may also be effected by manual depression of any key 109 corresponding to such punch. A contact 116a located at the lower extremity of link 116 is adapted to be closed by the link upon each operation of the same.

*Operation of the duplicator*

Figure 4:
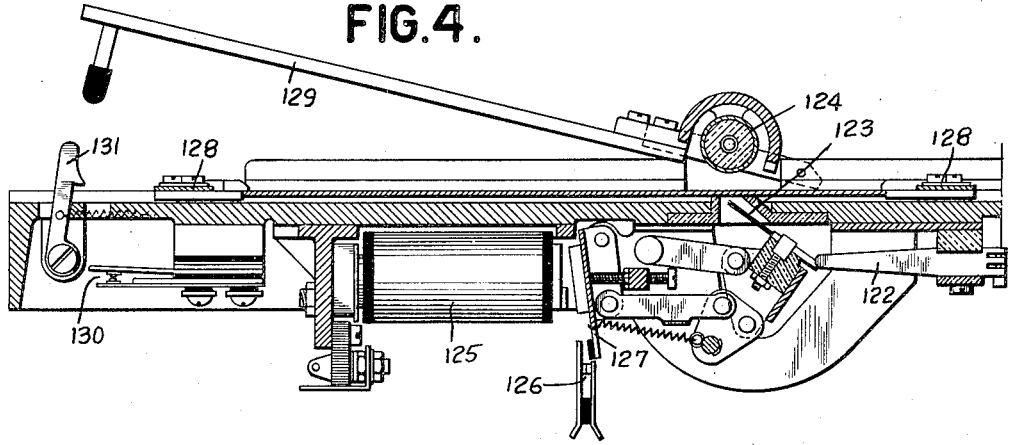
Fig. 4 is a section of the master card sensing mechanism taken on line 4—4 of Fig. 1.

The operation of the punches 100 may also be controlled by means of the duplicator which causes the selector magnets 107 to be actuated in accordance with the perforations of a previously punched master card. Each of the magnets 107 is electrically connected to a related spring contact plate 122 (Fig. 4) a series of which is carried by an insulating block. Each spring 122 is adapted for a sliding continuous electrical contact with an associated brush 123 which is adapted to bear against a metal cylinder 124. The brushes 123 are mounted so as to be moved upwardly into cooperation with roller 124 whenever magnet 125 is energized. A contact 126 is adapted to be opened by armature 127 when the latter is attracted by the magnet 125.

The master card is placed in position between arms 128 (see also Fig. 1) attached to and extending from escapement rack 14 so that the master card will advance step by step with the new card being prepared. Closure of a door 129 causes closure of a pair of contacts 130 and a spring pressed latch 131 will hold the door shut. For further details of the construction and operation of the duplicator reference may be had to the application of F. L. Lee, Serial No. 307,819, filed September 24, 1928, now Patent No. 1,878,935, issued September 20, 1932.

*Column cut-out bar contacts*

The machine has provision in the form of a notched bar for cutting out reproducing operations under control of the master card. A contact controlled by this bar permits such reproducing only when it is closed. The bar 132 (Figs. 1 and 5) is removably mounted on the bed of the master card frame and has cut-out portions 133 co-extensive with the columns or fields to be reproduced by the card in the sensing machine. The high portions of bar 132 function to cut off the current to the initially punched card sensing devices while the new card is in position to receive punching under control of the master card or manual keys 109. A spring-pressed lever 128a is pivoted upon one arm 128 attached to escapement rack 14 and has a depending projection 134 moving with the rack between bar 132 and a universal rod 135 pivoted at 136. As the rack escapes, the high or cam portions of bar 132 will urge projection 134 against bail 135 rocking it so that a depending finger 137 will cooperate with and close a pair of contacts 138 and open contacts 139.

*Skip bar*

Figure 6:
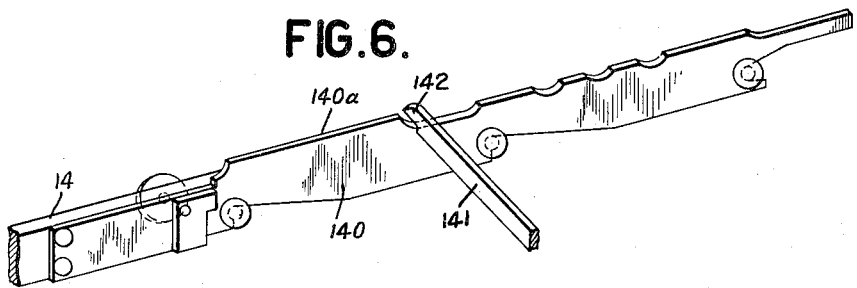
Fig. 6 is a detail of a skip bar.

The punching machine is provided with the usual skip bar 140 (Figs. 3, 6, and 7) removably mounted upon escapement rack 14 and provided with suitable notches and cam surfaces which cooperate with the usual skip lifter arm 141 which has a beveled end 142. In a well known manner through depression of the usual skip key which is the "X" or "11" index point position key, the lifter arm 141 is moved to the left as viewed in Fig. 6 so that the beveled end thereof cooperates with the cam surface of bar 140 to raise the end of the lifter.

The end of the lifter lies under stepping dog 94 and upon being so raised elevates the dog to release the rack 14. Lifter arm 141 will drop into the next notch in bar 140 and dog 94 will interrupt further movement of the rack beyond such point. The function of this skip bar 140 is to skip over the columns or fields which are not to be punched. An extra high portion 140a may also be provided on bar 140 to automatically elevate lifter arm 141 and cause the field of the card co-extensive therewith to be skipped.

Miscellaneous punching machine contacts

In Fig. 7, punching machine rack 14 carries a plate 145 adapted to engage and rock a lever 146, pivoted upon a fixed member of the machine, when the last column of the card is in punching position. This lever, when so rocked, will open contacts 147 and 148 and close contacts 149 and 150 (Fig. 8). The sensing machine has a pair of contacts 147a opened similarly to contacts 147.

In the punching machine the raising of stepping dog 94 will rock a member 151, loosely pivoted on rod 97 and having a lateral projection resting on the upper edge of the dog 94. Rocking of the member will open contacts 152.

The space key 109a (Fig. 2) is adapted to effect an operation of the escapement mechanism to advance the card one step in a known manner. In addition, a pin 156 in the shank of the key will close a pair of contacts 157.

Column selector

The mechanism heretofore described is substantially similar to that shown and described in the patent of C. D. Lake et al., already referred to. In the following description, the mechanism which constitutes the improvement over such patent will be set forth in specific detail.

Figure 5:
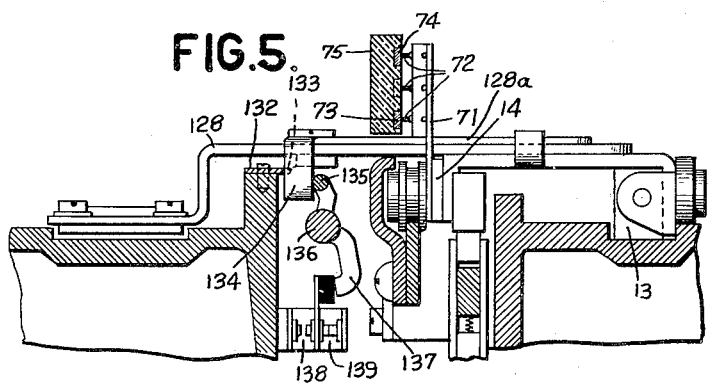
Fig. 5 is a detail of the blank card carriage taken on line 5—5 of Fig. 3.

Referring to Figs. 1, 3, and 5, the rack 14 associated with the punching machine, carries an arm 71 which supports, insulated therefrom, a trio of contact wipers 72 which are electrically connected to one another. The lowermost wiper 72 is adapted to contact with a common strip of conducting material 73 while the upper two alternately contact with insert segments 74, all of which segments and strip are mounted in a bar of insulating material 75 which may be supported from a fixed portion of the machine in any suitable manner.

The horizontal spacing between segments 74 corresponds to the columnar spacing of the record card in the punching machine and as the rack 14 moves step by step to advance the record card, the brushes 72 will advance in a similar manner to successively cooperate with the several insert segments 74 connecting each in turn with the common strip 73. The manner in which these contact devices cooperate with the remainder of the mechanism will be more fully explained in connection with the circuit diagram.

Card sensing mechanism

The mechanism for sensing the initially punched record card is shown in Figs. 11 and 12. In Fig. 11, the record card is shown in a position to which it has been advanced by the mechanism described above. The card will remain in this position with its forward end engaging guide 13a and its rear end engaged by pusher 12a, both of which are connected to the escapement or release bar 14a. In Fig. 9, bar 14a is shown as having a notch 76 which is engaged by a dog 77. With the card in position as shown in Fig. 11, dog 77 will hold rack 14a until it is rocked out of engagement by magnet 78 which, upon energization, will rock the dog 77 about its pivot 77a to release the bar 14a which will then, under the influence of its spring, move toward the left as viewed in Fig. 11, into position to be ejected by the mechanism already described. This releasing action of bar 14a does not take place until the new card has been completely punched, the initially punched card remaining in the position shown in Fig. 11 until such time.

Disposed immediately above the record card is a reading box, generally designated 79, of insulating material. The box 79 carries a plurality of columns of sensing pins 80, normally pressed downwardly by springs 81 engaging collars on the sensing pins. The spacing of the columns of pins 80 corresponds to the spacing of the columns of the record card to be sensed and the spacing between the pins in the columns corresponds to the spacing of the index point positions of the record card.

Each row of pins 80 corresponding to an index point position of the card has its upper end extending through a hole in a strip of conducting material 82 (see also Fig. 10a) so that all the pins 80 in a row are electrically connected. Pin box 79 is guided for vertical movement by suitable guide posts and is normally held upwardly by springs 83 pressing upwardly against angular members 84 secured to the sensing box 79. The lower ends of the springs press against the enlarged ends of bolts 85 which are suspended from the fixed portion of the machine frame 86.

The toggle mechanism comprises pairs of links 87, one link of each of which is pivoted at 88 to the sensing box 79 and the other at 89 to the fixed frame of the machine. The point of connection between links 87 has connection with a link 90 to which is also pivoted at 91 armature 92. A magnet 93 upon energization will rock its armature 92 and move link 90 toward the right as viewed in Fig. 11. This will cause straightening of toggle links 87 and consequent downward movement of sensing box 79 against the compression of springs 83. Movement of sensing box 79 will bring the pins 80 into engagement with the upper face of the card in sensing position and pins 80 will pass through any perforations which may occur in the card. Connected to link 90 at 158 is a pivoted bell crank 159 having link connection 160 to a pivoted adjusting finger 161 which is adapted, as the pin box is descending to sensing position, to engage the rear edge of the card and securely align it, if it is not already in correct position.

Each column of pins 80 (Fig. 12) makes contact with a common strip 162 of which there is one for each column of the record card analyzed. Thus, as will be clear from an inspection of Fig. 10a, a perforation in a particular index point position of a column of the record card will cause an electrical connection, through the medium of a pin 80, between the bar 162 of the column in which the perforation is to be found and the transversely arranged common bar 82 corresponding to the particular index point position of the perforation. The manner in which such electrical connection serves to control the further operation of the machine will be further explained in connection with the circuit diagram.

Miscellaneous sensing machine contacts

A contact 163 (Fig. 11) is adapted to be opened by an adjustable screw 164 carried by link 90 when the latter is moved toward the right to lower the sensing box 79 and the contact 163 will remain open while the box is in its lower position. In Fig. 1, a contact 165 is adapted to be engaged by a projection 165a on rod 15a and closed when the rod is moved to the left end of its feeding stroke. The functions of these contacts will be more fully set forth in connection with the circuit diagram of the apparatus.

Operation of the machine

The general operation of the machine will now be explained in connection with a specific example to bring out the various steps involved in the automatic reproduction of a group of cards. A new card, hereinafter called the 80 column card, is to be perforated under control of a previously punched card, identified as the 45 column card. Other data will also be punched in the 80 column card from an 80 column master card.

In Fig. 14 is shown a 45 column card, certain of the data on which are to be reproduced in 80 column form as in Fig. 15. Examination of these two cards will show that the "month", "date", "year", "agency", "serial No. ", "sale price", and "stock" are reproduced in fields of the same capacity, that is, fields employing the same number of columns as in the 45 column card. The "code No." field has a greater capacity and this information is derived from the "master card" as is also the "X" perforation in the "credit" field.

Skip bar 140 is provided with a high portion 140a co-extensive with columns 1 to 35 of the 80 column card and columns 71 to 74, inclusive, and consequently no punching will take place in these columns. Cut-out bar 132 (Fig. 1) is notched in this case to agree with the skip bar 140 to open the circuits to the duplicating punches 123 in those fields which have perforations not to be duplicated from the master card.

The master card is an 80 column card arranged with perforations in the "code No.", "credit" and "order No." fields, which perforations are to be duplicated in each new 80 column card.

In the circuit diagram (Fig. 13) is shown a plug board 166 upon which a series of plug sockets 167 are located. These sockets extend through suitable electrical connections to the bars 162 of the reading or sensing box. A second series of plug sockets 168 are in turn suitably connected to the segments 74 of the column selector of the punch. Connection may be made between any socket 166 and any socket 168 so that when the contact wiper 71 cooperates with the segment 74 associated with the plug connected socket 168 there will be a continuous connection from common strip 73 through the wiper 71, segment 74, socket 168, the plug connection to the selected socket 167 and thence to the associated common strip 162. The further detailed tracing of such circuit will be explained later.

In setting up or plugging the machine for a particular reproducing problem, the sockets 167 associated with the columns of the initially punched card which it is desired to reproduce are plug connected to the sockets 168 of the columns in which it is desired to reproduce such data. For the arrangement shown in the examples of Figs. 14 and 15, plug sockets 167 of columns 11 to 19 are plug connected in the manner shown by dotted line connections on the plug board 166 to the plug sockets 168 of columns 36 to 44. Sockets 167 of columns 24 to 29 are connected to sockets 168 of columns 59 to 64. Sockets 167 of columns 30 to 34 are connected to sockets 168 of columns 54 to 58 and socket 167 of column 45 is connected to socket 168 of column 80.

A set of plug sockets 170 is provided which in a manner to be explained, cause repetition punching of data in each new card in accordance with the plugging connections made between sockets 170 and sockets 168. For instance, in order to cause repetition punching of the "consigned value" 04522 as punched in the card of Fig. 15, plug connections are made from the plug sockets in the 0, 4, 5, and 2 positions as indicated, to the sockets 168 of the columns in which these respective figures are to be perforated.

Circuit diagram

In Fig. 13 is shown the wiring diagram of the electric circuit of the entire apparatus. The wiring of the sensing machine is shown on the upper part of the sheet and the wiring of the punching machine is on the lower portion of the two sections being separated by the heavy horizontal broken line.

The connections between the two machines are indicated as individual lines which are connected within a single cable with suitable plug terminals for ready connection or separation.

The operations involved in reproducing cards in accordance with the example chosen will now be traced in their order of occurrence on the diagram.

Current is supplied from a source through a switch 171 to lines 172 and 173. Assuming cards are in position in the feed magazines 10 and 10a, depression of space key 109a will establish a circuit as follows: from line 173, contact 157, relay coil 174, wire 175, contact 147a, wire 176, contact 149, to opposite side of line 172. It will be recalled that contacts 147a and 149 are closed when their respective card carriages are in their extreme left position, as viewed in Fig. 1. Energization of relay coil 174 closes its points 174a and causes completion of the following circuit: from line 172, contacts 149, wire 176, contacts 147a, wire 175, relay coil 174, points 174a, from which point the circuit takes two paths, one extending through magnet 62 to line 173 and the other extending through a wire 177 and thence through magnet 62a to line 173. Energization of magnets 62 and 62a will operate their respective ejecting mechanisms but since at this time there are no cards in position in either unit, the ejecting operation is ineffectual.

At the end of the stroke of the ejector jaws, contacts 70 and 70a are closed, establishing circuits through the trip magnets of the automatic feeding clutches as follows: line 172, contact 70a, wire 178, contacts 70, trip magnet 37, brush magnet contact 126, to line 173. A circuit may also be traced in series through contacts 70a and 70 and thence through wire 179 through trip magnet 37a, wire 180, interlock relay 181, to line 173. Energization of relay 181 opens its points 181a to interrupt the feed circuit to the common strip 73 so that no current is supplied to the column selecting devices while a new card is being introduced.

Energization of magnets 37 and 37a trips their respective clutch dogs into engagement with their driving ratchets and also shifts contacts 45, 46, and 46a to supply current to the motors 20 and 20a. Motor 20 is energized from line 172, contact 46, now closed, motor 20, contact 126, to line 173. Motor 20a is energized from line 172, contact 46a, now closed, motor 20a, wire 180, relay coil 181, to line 173. Motor 20 thereupon advances a new card to present its first column to the punches and motor 20a advances an initially punched card to the sensing station. At the end of the feeding stroke, contacts 45, 46, and 46a are unlatched and resume positions as shown in the circuit diagram. When the rack 15a of the sensing unit is moved to the left, as viewed in Fig. 1, it will momentarily close contact 165 and the following circuit will then be complete: from line 172, contact 165, reading box magnet 93, to line 173. A circuit may also be traced through contact 165, relay coil 182, to line 173. Relay 182, upon closure of its points 182a, will provide a holding circuit for reading box magnet 93 as follows: from line 172, contact 148 (closed in or by the last column position of the card), wire 183, relay points 182a, relay coil 182, to line 173. The circuit will also extend from points 182a through reading box magnet 93 to line 173. Energization of magnet 93, as already explained in detail, will lower the reading pins against the card in sensing position and the reading box will remain in such lowered position until contact 148 opens at which time each column of the card to be punched will be presented to the column of punches.

In the punching machine, the feeding of a blank card to its first column punching position will be followed by the immediate escapement of the rack and card to the first punching position which is to be column 36 in the example under consideration. This is effected due to the high position of skip bar 140 which, as has been pointed out, prevents the entry of the escapement pawls into the teeth of the escapement rack 14.

The contact wiper 71 of the column selector will be correspondingly positioned so as to connect common strip 73 with insert segment 74 in the thirty-sixth column position. From this point on, punching and escaping of the new card will take place under control of the sensing mechanism.

During the automatic skipping of the first thirty-five columns of the blank card, circuit breaker contact 152 will, of course, be open, preventing any circuits during this interval. Immediately upon closure of contact 152, the punching will take place in column 36 of the new card under control of column 11 of the initially punched card (see Figs. 14 and 15). The circuit which effects such punching operation will now be traced in detail: from line 172, contacts 45, contacts 152, common bar 184, one of the magnets 107 (in this case the zero magnet), wire 185, to the zero plug socket 170, and thence through wire 186 to the zero bar 82. In the eleventh column, zero bar 82 will be electrically connected through the sensing pin to the bar 162 of column 11, from whence the circuit will extend to plug socket 167 of the eleventh column and through plug wire connection 187, to socket 168 associated with the thirty-sixth column of the 80 column card, wire 188, segment 74, contact wiper 71, now located in this column in position, common strip 73, wire 189, relay contacts 181a (now closed), wire 190, switch 191, contacts 139 (now closed) to line 173.

Energization of magnet 107 will close punch magnet contact 111 to energize the punch magnet 112 through a circuit from line 172, contacts 45, wire 192, contacts 111, punch magnet 112, to line 173. In this manner, the zero punch is operated to perforate a zero in the thirty-sixth column of the 80 column card. The punching action, as explained, will momentarily open contacts 152 and as soon as these contacts again close the columns in fields headed "month", "day", "year", and "agency" will be reproduced in rapid succession through circuits similar to the one traced in connection with the first punching operation.

As the 80 column card advances from column 44 to 45, its cut-out bar opens contacts 139 and closes contacts 138 thereby disconnecting the current supply to the column selector 75 and connecting duplicating brushes 123 so that the successive columns in the "code No." field will be punched under control of the master card. Each separate circuit follows from line 172, contacts 45, wire 192, contacts 152, bar 184, magnet 107, wire 192a, brush 123, hole in the master card, common roller 124, wire 193, contacts 130 and 138, to line 173. In this manner the columns 45 to 53 of the 80 column card are punched in raised succession under control of the perforations in the master card.

Advancing from column 53 to 54, contacts 138, 139 are shifted back again and punching in fields "selling price" and "serial No." takes place under control of the 45 column card as before. Due to the plugging arrangement, however, the order of punching of these two fields will be reversed, that is, the "selling price" will be punched before and in advance of the "serial No." Punching of "consigned value" in columns 65 to 69 will take place under control of the gang punch plugging through circuits traced as follows: from line 173, contacts 139, switch 191, wire 190, relay contacts 181a, wire 189, common strip 73 of the column selector 75, contact wiper 71, now positioned in, let us say, column 65, segment 74 and plug socket 168 of this column, then through a plug connection 194 to the zero plug socket 170, wire 185, zero punch selecting magnet 107, common 184, contacts 152 and 45, to line 172. Under control of the circuit just traced, a zero will be punched in column 65 of the 80 column card. In a similar manner, through the appropriate plug sockets 170, the remaining columns of the "consigned value" field are punched.

As the master card escapes from the sixty-ninth to the seventieth column, contacts 139 and 138 are again shifted and punching in the "credit" and "order No." fields takes place under control of the master card in known manner.

Return of contacts 138 and 139 to the position of the diagram will cause reproduction of the last column of each card, namely "stock". As the punching machine escapes from the seventy-ninth to the eightieth column, contacts 148, 149, and 150 are shifted, as explained, and subsequent energization of magnet 112 to punch in the eightieth column will open contacts 152 which then remain open. At the same time, as the punch magnet 112 is energized to punch in the eightieth column, contact 116a is closed momentarily, setting up relay 174 through a shunt circuit around space key 157 to establish the start circuit traced above.

Contact 126 in series with magnet 37 and motor 20 prevents operation of these devices when the brushes 123 are against the master card, thus eliminating undue friction on the card while it is being moved back to be reread by the brushes.

Opening of contacts 148 upon movement of the 80 column card from the seventy-ninth to the eightieth column punching position will break the circuit of the reading box magnet 93 and the reading box will consequently be moved upwardly away from the card under the influence of its return springs. This upward movement of the reading box will permit closure of contacts 163, setting up a circuit traceable from line 172, contacts 149, wire 176, contacts 163, release magnet 150

78, to line 173. This action, as heretofore explained, will cause the rapid advance of the 45 column card to a position where its leading edge is introduced between the jaws of the ejector mechanism. From this point on the operation of the machine as just described in detail, will be repeated and may be continued as described until the cards are exhausted. If desired, card levers and contacts may be provided to cut off automatic operation upon failure of either card feeding mechanism to advance a card in its respective machine.

Gang punching operation

The punching machine may be operated as a separate unit independently of the sensing machine by opening switches 195 and 191. By closing switch 196, the punching machine may now be used as a gang punch. In those columns in which it is desired to gang punch information suitable plug connections 194 are made between the plug sockets 168 of such columns and the proper sockets 170, depending upon the value of the information to be punched in the selected columns. Thus, as the 80 column card is advanced through the punching machine, circuits will be automatically and successively completed in the gang punched columns as follows: from line 173, contacts 139, switch 196 (now closed), common 73, wiper 71, segments 74, sockets 168, plug connections 194, sockets 170, wires 185, punch selecting magnets 107, common 184, contacts 152 and 45, to line 172.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

What is claimed is as follows:

1. In a card reproducing system, a sensing machine with means for feeding a pattern card, a punching machine with means for automatically effecting a step by step movement of a work card, means for concurrently reading a plurality of index point positions in a plurality of columns in said pattern card, means controlled by said reading means to effect a duplicate perforation in said work card, and means controlled by said punching machine as an incident to the last punching operation for effecting an automatic movement of said pattern card.

2. In a machine of the class described, a plurality of punch operating devices, one for each index point position of a record column, means for concurrently reading a plurality of columns of a record for data designations, means controlled by said reading means for concurrently associating said plurality of columns of the record with said devices, and means cooperating with said associating means for causing the operation of said devices to perforate a record, column by column.

3. In a machine of the class described, a plurality of punch operating magnets, one for each index point position of a record column, means for concurrently reading a plurality of columns of a record, circuit connections effected by said reading means whereby said magnets are simultaneously, electrically associated with each column of the card in which perforations occur, and means controlled through said connections for operating said magnets to punch a duplicate record, column by column.

4. In a machine of the class described, a column of punch magnets, a column of contact bars connected thereto, representative of rows of index point positions, a plurality of contact bars representative of record columns, record controlled means for concurrently connecting said first named bars to said second named bars and means for rendering said second named bars successively effective to control the operation of said punch magnets.

5. In a machine of the class described, means for concurrently reading the index point positions of a plurality of columns of a record card, a set of punch selecting magnets, a plurality of contact devices, one for each card column, means controlled by said reading means for completing electrical connections between said magnets and said devices, a source of current and means for successively connecting said devices to said source of current to complete circuits through said magnets.

HAROLD L. READ.